(12) United States Patent
Shin et al.

(10) Patent No.: US 9,501,130 B2
(45) Date of Patent: Nov. 22, 2016

(54) DATA STORAGE DEVICE AND DATA PROCESSING SYSTEM INCLUDING THE SAME

(71) Applicant: SK hynix Inc., Gyeonggi-do (KR)

(72) Inventors: Dong Jae Shin, Gyeonggi-do (KR); Seung Jin Park, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 154 days.

(21) Appl. No.: 14/198,248

(22) Filed: Mar. 5, 2014

(65) Prior Publication Data

US 2015/0178009 A1 Jun. 25, 2015

(30) Foreign Application Priority Data

Dec. 24, 2013 (KR) .......................... 10-2013-0162439

(51) Int. Cl.
*G06F 1/32* (2006.01)
*G06F 12/02* (2006.01)

(52) U.S. Cl.
CPC ........... *G06F 1/3275* (2013.01); *G06F 1/3268* (2013.01); *G06F 12/0246* (2013.01); *Y02B 60/1246* (2013.01); *Y02B 60/32* (2013.01)

(58) Field of Classification Search
CPC ............. G06F 3/0625; G06F 12/0246; G06F 1/3275; G06F 3/0683; G06F 3/0658
See application file for complete search history.

(56) References Cited

U.S. PATENT DOCUMENTS

| | | | | |
|---|---|---|---|---|
| 2012/0151125 A1* | 6/2012 | Yang | ................... | G06F 12/0246 711/103 |
| 2014/0068318 A1* | 3/2014 | Oikawa | ......................... | 714/6.1 |
| 2014/0226400 A1* | 8/2014 | Kimura | ................. | G06F 1/3225 365/185.08 |
| 2015/0052374 A1* | 2/2015 | Kang | ............................ | 713/323 |
| 2015/0074330 A1* | 3/2015 | Sawamura | .......... | G06F 12/0246 711/103 |
| 2015/0106573 A1* | 4/2015 | Yi | ................................. | 711/148 |

FOREIGN PATENT DOCUMENTS

KR 1020060094841 8/2006

* cited by examiner

*Primary Examiner* — Zhuo Li
(74) *Attorney, Agent, or Firm* — IP & T Group LLP (57) ABSTRACT

A data processing system includes a host device including a first volatile memory device, and a data storage device including a second volatile memory device and a nonvolatile memory device, and suitable for storing data to be accessed by the host device. The data storage device uploads data stored in the second volatile memory device to the first volatile memory device before the data storage device in a normal mode enters a power-save mode.

13 Claims, 6 Drawing Sheets

DATA STORAGE DEVICE AND DATA PROCESSING SYSTEM INCLUDING THE SAME

CROSS-REFERENCES TO RELATED APPLICATION

The present application claims priority under 35 U.S.C. §119(a) to Korean application number 10-2013-0162439, filed on Dec. 24, 2013, in the Korean Intellectual Property Office, which is incorporated herein by reference in its entirety.

BACKGROUND

1. Technical Field

Various embodiments relate to a data storage device, and more particularly, to a data storage device capable of sharing a working memory device with a host device.

2. Related Art

Recently, a paradigm for a computing environment has been converted into ubiquitous computing so that computer systems can be used anytime and anywhere. Due to this fact, the use of portable electronic devices such as mobile phones, digital cameras, and laptops has rapidly increased. In general, such portable electronic devices use a data storage device having a memory device. The data storage device stores data to be used in the portable electronic device.

The data storage device having the memory device provides advantages in that there is no mechanical driving part, and thus, stability and durability are excellent, an information access speed is high, and power consumption is small. The data storage devices having such advantages include a universal serial bus (USB) memory device, a memory card having various interfaces, a universal flash storage (UFS) device, and a solid state drive (SSD).

SUMMARY

A data storage device capable of sharing the working memory device with the host device is described herein.

In an embodiment of the present disclosure, a data processing system may include a host device including a first volatile memory device, and a data storage device including a second volatile memory device and a nonvolatile memory device, and suitable for storing data to be accessed by the host device, wherein the data storage device is uploads data stored in the second volatile memory device to the first volatile memory device before the data storage device in a normal mode enters a power-save mode.

In an embodiment of the present disclosure, a data processing system may include a host device including a first volatile memory device, and a data storage device suitable for storing data to be communicated by the host device, wherein the data storage device includes a controller suitable for controlling an operation of the data storage device, a second volatile memory device suitable for storing data necessary to drive the controller, and an access block suitable for uploading data stored in the second volatile memory device, to the first volatile memory device according to control of the controller before the data storage device in a normal mode enters a power-save mode.

In an embodiment of the present disclosure, a data storage device may include a nonvolatile memory device, and a controller suitable for storing data in the nonvolatile memory device and providing data stored in the nonvolatile memory device to a host device according to a request from the host device, wherein the controller includes a control unit, a volatile memory device suitable for storing data necessary to drive the control unit, and a host interface unit including an access block which is suitable for uploading data stored in the volatile memory device, to the host device according to control of the control unit before the data storage device in a normal mode enters a power-save mode, and interfacing the host device and the controller.

According to the embodiments of the present disclosure, it is possible to share the working memory device between the data storage device and the host device, and thus the performance of the data storage device may be improved.

BRIEF DESCRIPTION OF THE DRAWINGS

Features, aspects, and embodiments are described in conjunction with the attached drawings, in which.

DETAILED DESCRIPTION

In the present invention, advantages, features and methods for achieving them will become more apparent after a reading of the following exemplary embodiments taken in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains can easily enforce the technical concept of the present invention.

It is to be understood herein that embodiments of the present invention are not limited to the particulars shown in the drawings and that the drawings are not necessarily to scale and in some instances proportions may have been exaggerated in order to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, a data storage device and a data processing system including the same according to the present disclosure will be described below with reference to the accompanying drawings through exemplary embodiments.

Figure 1:
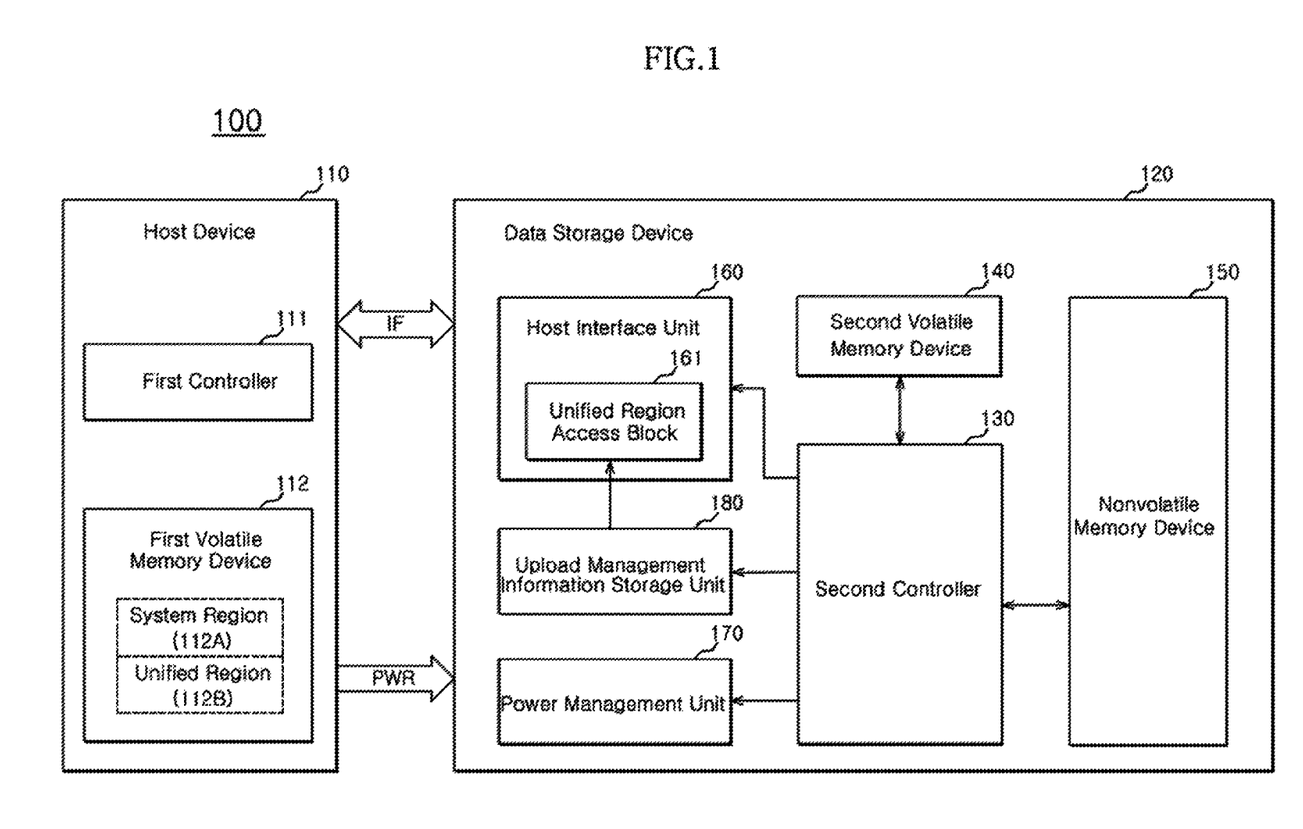
FIG. 1 is a block diagram exemplarily showing a data processing system in accordance with an embodiment of the present disclosure.

FIG. 1 is a block diagram exemplarily showing a data processing system 100 in accordance with an embodiment of the present disclosure. Referring to FIG. 1, the data processing system 100 may include a host device 110 and a data storage device 120.

The host device 110 may include a portable electronic device such as a mobile phone, an MP3 player and a laptop computer, or an electronic device such as a desktop computer, a game player, a TV and an in-vehicle infotainment system.

The host device 110 may include a first controller 111 and a first volatile memory device 112. While it is shown that the first volatile memory device 112 is configured outside the first controller 111, it is obvious that the first volatile memory device 112 may be configured inside the first controller 111.

The first controller 111 may control general operations of the host device 110 through driving of firmware or software loaded on the first volatile memory device 112. The first controller 111 may decode or drive a code type instruction or algorithm such as the firmware or the software. The first controller 111 may be realized in the type of hardware or in a combined type of hardware and software. The first controller 111 may include a micro control unit (MCU) and/or a central processing unit (CPU).

The first volatile memory device 112 may store the firmware or the software to be driven by the first controller 111. Also, the first volatile memory device 112 may store data necessary to drive the firmware or the software. That is to say, the first volatile memory device 112 may operate as a working memory device of the first controller 111.

The first volatile memory device 112 may be divided into a system region 112A and a unified region 112B. The system region 112A may be a dedicated memory region for the first controller 111. That is to say, the first controller 111 may exclusively access and use the system region 112A. The unified region 112B may be shared by the first controller 111 and a second controller 130 of the data storage device 120. That is to say, both of the first controller 111 and the second controller 130 may access and use the unified region 112B. As another embodiment of the present disclosure, the unified region 112B may be a dedicated memory region for the second controller 130 of the data storage device 120. That is to say, the second controller 130 may exclusively access and use the unified region 112B.

The first controller 111 may allocate the unified region 112B in the first volatile memory device 112. When the unified region 112B is allocated by the first controller 111, the size of the unified region 112B may be fixed or changed.

The first controller 111 may provide address information of the allocated unified region 112B to the data storage device 120.

The data storage device 120 may operate in response to a request of the host device 110. The data storage device 120 may store data to be accessed by the host device 110. The data storage device 120 may also be a memory system.

The data storage device 120 may be any one of various kinds of storage devices according to the protocol of a host interface IF, which is electrically coupled with the host device 110. For example, the data storage device 120 may be any one of various kinds of storage devices such as a solid state drive (SSD), a multimedia card in the form of a multimedia card (MMC), an embedded MMC (eMMC), a reduced size MMC (RS-MMC) and a micro-MMC, a secure digital card in the form of a secure digital (SD) card, a mini-SD card and a micro-SD card, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-E) card type storage device, a compact flash (CF) card, a smart media card, a memory stick, and so forth.

The data storage device 120 may be manufactured as any one of various kinds of package types. For example, the data storage device 120 may be manufactured as any one of various kinds of package types such as a package-on-package (POP), a system-in-package (SIP), a system-on-chip (SOC), a multi-chip package (MCP), a chip-on-board (COB), a wafer-level fabricated package (WFP), a wafer-level stack package (WSP), and so forth.

The data storage device 120 may include the second controller 130, a second volatile memory device 140, a nonvolatile memory device 150, a host interface unit 160, a power management unit 170, and an upload management information storage unit 180. Although not shown, the second controller 130 may include a control unit configured to decode and drive firmware or software, an error correction code unit configured to detect and correct an error of the data stored in the nonvolatile memory device 140, and a memory interface unit configured to interface the control unit and the nonvolatile memory device 140. The host interface unit 160 may include a unified region access block 161. While it is shown that the unified region access block 161 is included in the host interface unit 160, it is obvious that the unified region access block 161 may be configured outside the host interface unit 160.

The second controller 130 may be configured to control general operations of the data storage device 120 through driving of firmware or software loaded on the second volatile memory device 140. The second controller 130 may be configured to decode or drive a code type instruction or algorithm such as the firmware or the software. The second controller 130 may be realized in the type of hardware or in a combined type of hardware and software. The second controller 130 may comprise a micro control unit (MCU) and/or a central processing unit (CPU).

The second volatile memory device 140 may be a dedicated memory device for the second controller 130. The second volatile memory device 140 may store the firmware or the software to be driven by the second controller 130. Also, the second volatile memory device 140 may store data necessary to drive the firmware or the software. That is to say, the second volatile memory device 140 may operate as a working memory device of the second controller 130.

The second volatile memory device 140 may temporarily store data to be transmitted from the host device 110 to the nonvolatile memory devices 150 or from the nonvolatile memory device 150 to the host device 110. Namely, the second volatile memory device 140 may operate as a buffer memory device or a cache memory device.

The nonvolatile memory device 150 may operate as storage media of the data storage device 120. The nonvolatile memory device 150 may be any one of various types of nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PCRAM) using a chalcogenide alloy, and a resistive random access memory (ReRAM) using a transition metal oxide. The FRAM, the MRAM, the PCRAM and the ReRAM are nonvolatile RAM devices capable of random access to a memory cell. The nonvolatile memory device 150 may be a combination of a NAND flash memory device and one or more of the various types of nonvolatile memory devices (for example, nonvolatile RAM devices) described above.

The host interface unit 160 may interface the host device 110 and the data storage device 120 according to the protocol of the interface IF. Although not shown, the host interface unit 160 may include configuration blocks corresponding to a physical layer, a link layer and a protocol layer, respectively. For example, the host interface unit 160 may include an interface unit using one or more of various interface protocols such as a USB protocol, a UFS protocol a MMC protocol, a PCI protocol, a PCI-E protocol, a parallel advanced technology attachment (DATA) protocol, a serial ATA (SATA) protocol, a small computer system interface (SCSI) protocol, a serial attached SCSI (SAS) protocol, and so forth.

The unified region access block 161 may access the unified region 112B. Also, the unified region access block 161 may be configured to access the second volatile memory device 140. The unified region access block 161 may operate independently or under control of the second controller 130. When the data storage device 120 enters the power-save mode from the normal mode, the unified region access block 161 may be configured to upload data stored in the second volatile memory device 140 to the unified region 112B according to an upload management information provided thereto under the control of the second controller 130. When the data storage device 120 enters the normal mode from the power-save mode, the unified region access block 161 may download the data, which may have been uploaded to the unified region 112B, to the second volatile memory device 140, independently from the control of the second controller 130, by referring to the upload management information stored in the upload management information storage unit 180.

The power management unit 170 may provide power PWR, which is provided from the host device 110, to the data storage device 120. For instance, the power management unit 170 may provide internal power generated based on the power PWR to the second controller 130, the second volatile memory device 140, the nonvolatile memory device 150, the host interface unit 160, and the upload management information storage unit 180.

The power management unit 170 may operate according to the normal mode and the power-save mode of the data storage device 120 under the control of the second controller 130. During the normal mode of the data storage device 120, the power management unit 170 may provide the internal power to the second controller 130, the second volatile memory device 140, the nonvolatile memory device 150, the host interface unit 160, and the upload management information storage unit 180. During the power-save mode of the data storage device 120 such as a sleep mode and a power-down mode, the power management unit 170 may provide the internal power to the host interface unit 160 and the upload management information storage unit 180 while the second controller 130, the second volatile memory device 140, and the nonvolatile memory device 150 may not be provided with the internal power.

During the normal mode of the data storage device 120, the second controller 130, the second volatile memory device 140, the nonvolatile memory device 150, the host interface unit 160, the unified region access block 161, the power management unit 170, and the upload management information storage unit 180 may be, activated by the power provided through the power management unit 170. During the power-save mode of the data storage device 120, the host interface unit 160, the power management unit 170 and the upload management information storage unit 180 may be activated by the power provided through the power management unit 170.

The upload management information storage unit 180 may be configured to store the upload management information provided by the second controller 130. Even though the data storage device 120 operates in the power-save mode, the power may be provided to the upload management information storage unit 180, and therefore, the upload management information may be continuously retained regardless of the normal mode and the power-save mode of the data storage device 120.

Figure 2:
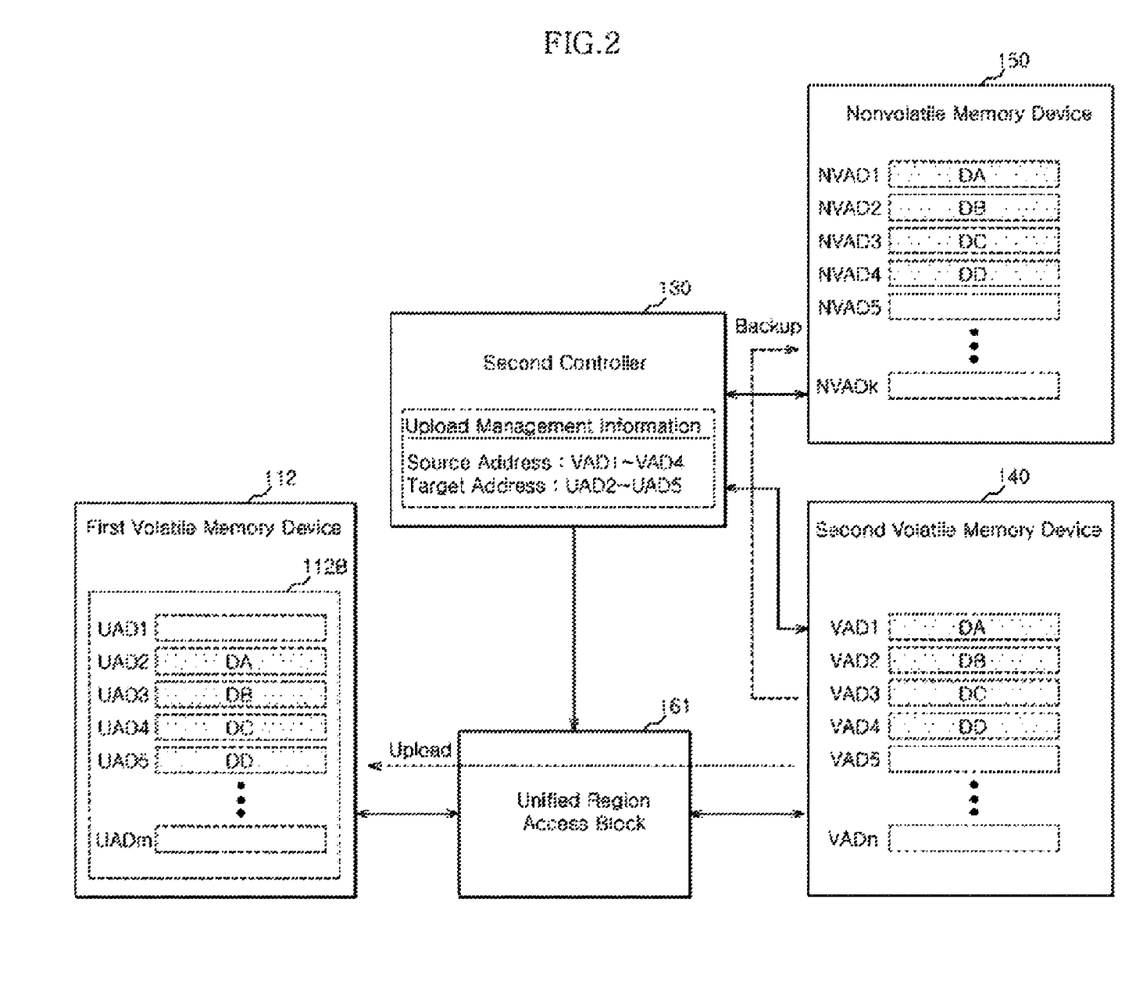
FIG. 2 is a block diagram exemplarily showing operations of a data storage device shown in FIG. 1 when the data storage device enters a power-save mode from a norm& mode in accordance with an embodiment of the present disclosure.

FIG. 2 is a block diagram exemplarily showing operations of the data storage device 120 shown in FIG. 1 when the data storage device 120 enters the power-save mode from the normal mode in accordance with an embodiment of the present disclosure. In order to ensure that the data storage device 120 may come back to the state before entry to the power-save mode when the data storage device 120 returns from the power-save mode to the normal mode, the second controller 130 may upload the data of the second volatile memory device 140 to the host device 110.

As shown in FIG. 2 the second controller 130 may set data DA, DB, DC and DD stored in the second volatile memory device 140 as subject data. For instance, the subject data DA, DB, DC and DD may include the codes of the firmware or the software to be driven by the second controller 130, for example, instruction codes, and code execution pointers; data necessary to drive the firmware or the software, for example, metadata, register setting values, and address mapping data; data to be stored in the nonvolatile memory device 150; and data to be transmitted to the host device 110.

The second controller 130 may generate the upload management information for managing the subject data. The upload management information may include addresses of the subject data stored in the second volatile memory device 140, which are referred to as source addresses hereinafter. For example, as shown in FIG. 2, the source addresses VAD1, VAD2, VAD3 and VAD4 of the second volatile memory device 140 corresponding to the subject data DA, DB, DC and DD may be included in the upload management information. Also, the upload management information may include addresses of the subject data to be stored in the unified region 112B, which are referred to as target addresses hereinafter. For example, as shown in FIG. 2, the target addresses UAD2, UAD3, UAD4 and UAD5 of the unified region 112B corresponding to the subject data DA, DB, DC and DD may be included in the upload management information.

The second controller 130 may provide the upload management information to the unified region access block 161. Further, the second controller 130 may control the unified region access block 161 so that the subject data DA, DB, DC and DD may be uploaded from the second volatile memory device 140 to the unified region 112B according to the source addresses and the target addresses included in the upload management information.

The unified region access block 161 may perform a data upload operation according to the provided upload management information under the control of the second controller 130. The unified region access block 161 may access the second volatile memory device 140 based on the source addresses VAD1, VAD2, VAD3 and VAD4 and may read the subject data DA, DB, DC and DD. The unified region access block 161 may access the unified region 112B based on the target addresses UAD2, UAD3, UAD4 and UAD5 and may store the subject data DA, DB, DC and DD.

After the upload operation of the unified region access block 261, the second controller 130 may prepare for entry to the power-save mode untill power supply is cut due to the entry to the power-save mode. That is to say, the second controller 130 may perform a data backup operation to prevent the data stored in the second volatile memory device 140 from being lost. For example, the second controller 130 may perform a backup operation by storing the subject data DA, DB, DC and DD in the nonvolatile memory device 150.

Figure 3:
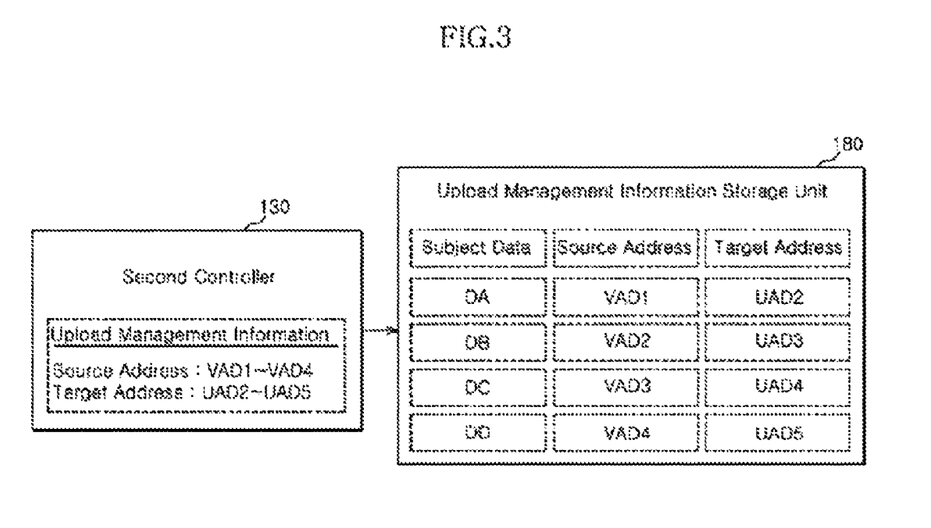
FIG. 3 is a diagram exemplarily showing upload management information to be stored in an upload management information storage unit shown in FIG. 1 in accordance with an embodiment of the present disclosure.
Figure 4:
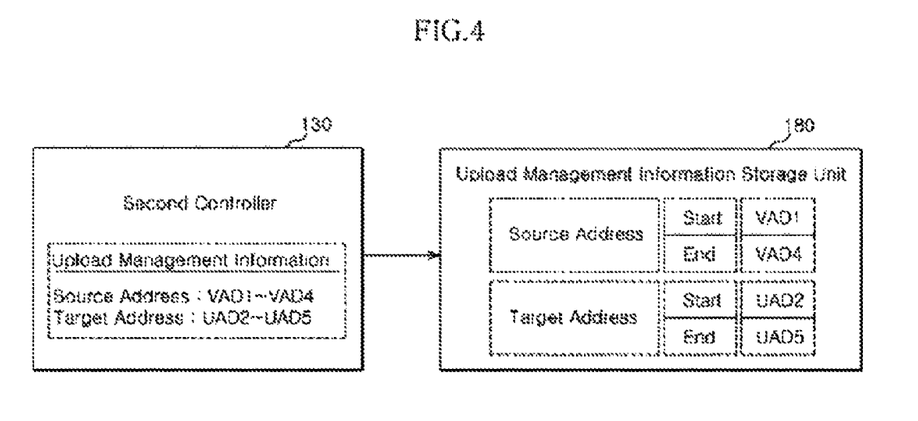
FIG. 4 is a diagram exemplarily showing upload management information to be stored in the upload management information storage unit shown in FIG. 1 in accordance with an embodiment of the present disclosure.
Figure 5:
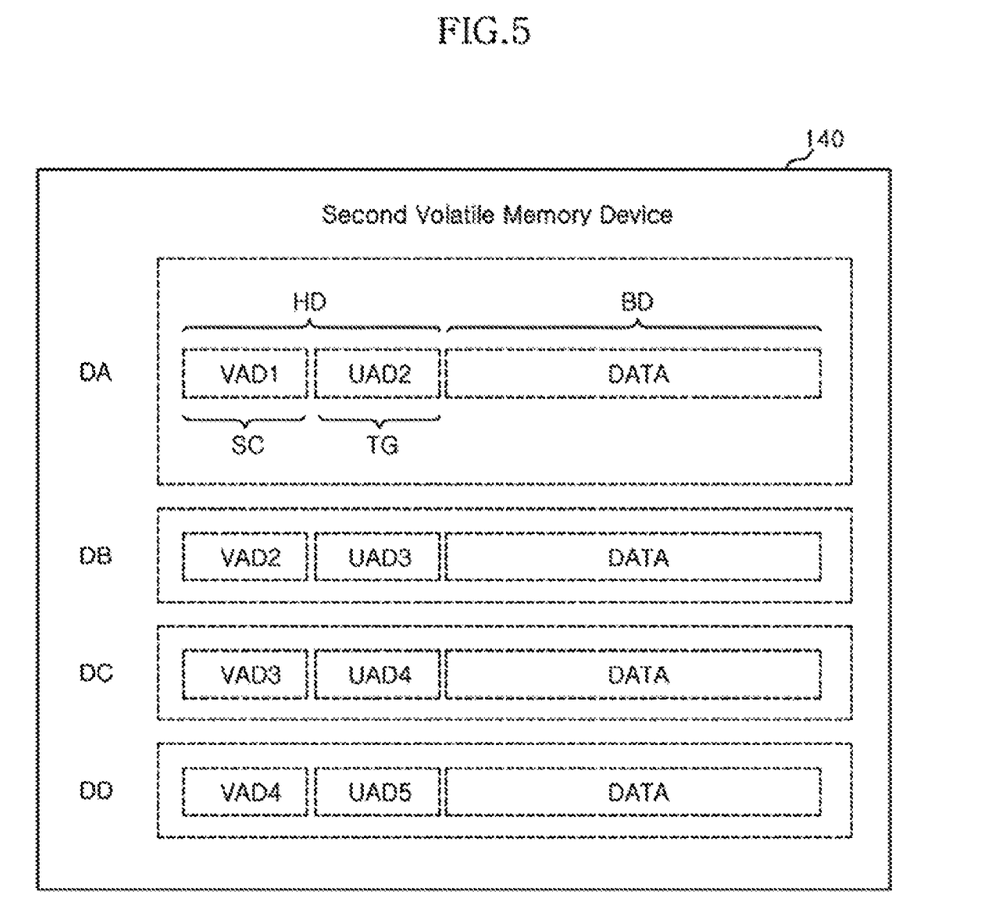
FIG. 5 is a diagram exemplarily showing header information added to information to be uploaded according to the upload management information scheme shown in FIG. 4 in accordance with an embodiment of the present disclosure.

FIG. 3 is a diagram exemplarily showing the upload management information to be stored in the upload management information storage unit 180 shown in FIG. 1 in accordance with an embodiment of the present disclosure. FIG. 4 is a diagram exemplarily showing the upload management information to be stored in the upload management information storage unit 180 shown in FIG. 1 in accordance with an embodiment of the present disclosure. FIG. 5 is a diagram exemplarily showing header information added to information to be uploaded according to the upload management information scheme shown ire FIG. 4 in accordance with an embodiment of the present disclosure.

When the data storage device 120 returns from the power-save mode to the normal mode, the subject data, which may be uploaded to the unified region 112B during previous normal mode, may be downloaded to ensure that the data storage device 120 may come back to the state before entry to the power-save mode. As described above, during the power-save mode, the second controller 130 may be deactivated due to cutoff of power supply. For this reason, the upload management information may be stored in the upload management information storage unit 80, which may stay activated even in the power-save mode.

The second controller 130 may generate the upload management information in a variety of ways. For instance, the second controller 130 may generate the upload management information representing correspondence relationship between the source addresses and the target addresses. In other words, the second controller 130 may generate the upload management information by matching each of the source addresses with each of the target addresses. For another instance, the second controller 130 may generate the upload management information representing ranges of the source addresses and the target addresses.

FIG. 3 shows the upload management information representing the correspondence relationship between the source addresses and the target addresses. Referring to FIG. 3, the second controller 130 may generate the upload management information such that the source address VAD1 of the subject data DA may correspond to the target address UAD2, the source address VAD2 of the subject data DB may correspond to the target address UAD3, the source address VAD3 of the subject data DC may correspond to the target address UAD4, and the source address VAD4 of the subject data DD may correspond to the target address UAD5.

FIG. 4 shows the upload management information representing the ranges of the source addresses and the target addresses. Referring to FIG. 4, the second controller 130 may generate the upload management information including a start address VAD1 and an end address VAD4 of the source addresses and a start address UAD2 and an end address UAD5 of the target addresses. In such case, an additional information for a correspondence relationship between the source addresses and the target addresses may be further included. The additional information for the correspondence relationship between the source addresses and the target addresses may be added to the subject data as header information.

FIG. 5 shows the head information HD added to the subject data when the upload management information represents the ranges of the source addresses and the target addresses such as shown in FIG. 4. Referring to FIG. 5, the header information HD may be generated by the second controller 130, and may be stored in the second volatile memory device 140 separately from the upload management information stored in the upload management information storage unit 180.

The header information HD may represent the correspondence relationship of source addresses SC and target addresses TG of the subject data. The header information HD may be attached to a body information BD, in which actual data DATA is to be uploaded. The header information HD and the body information BD constitute one subject data.

Figure 6:
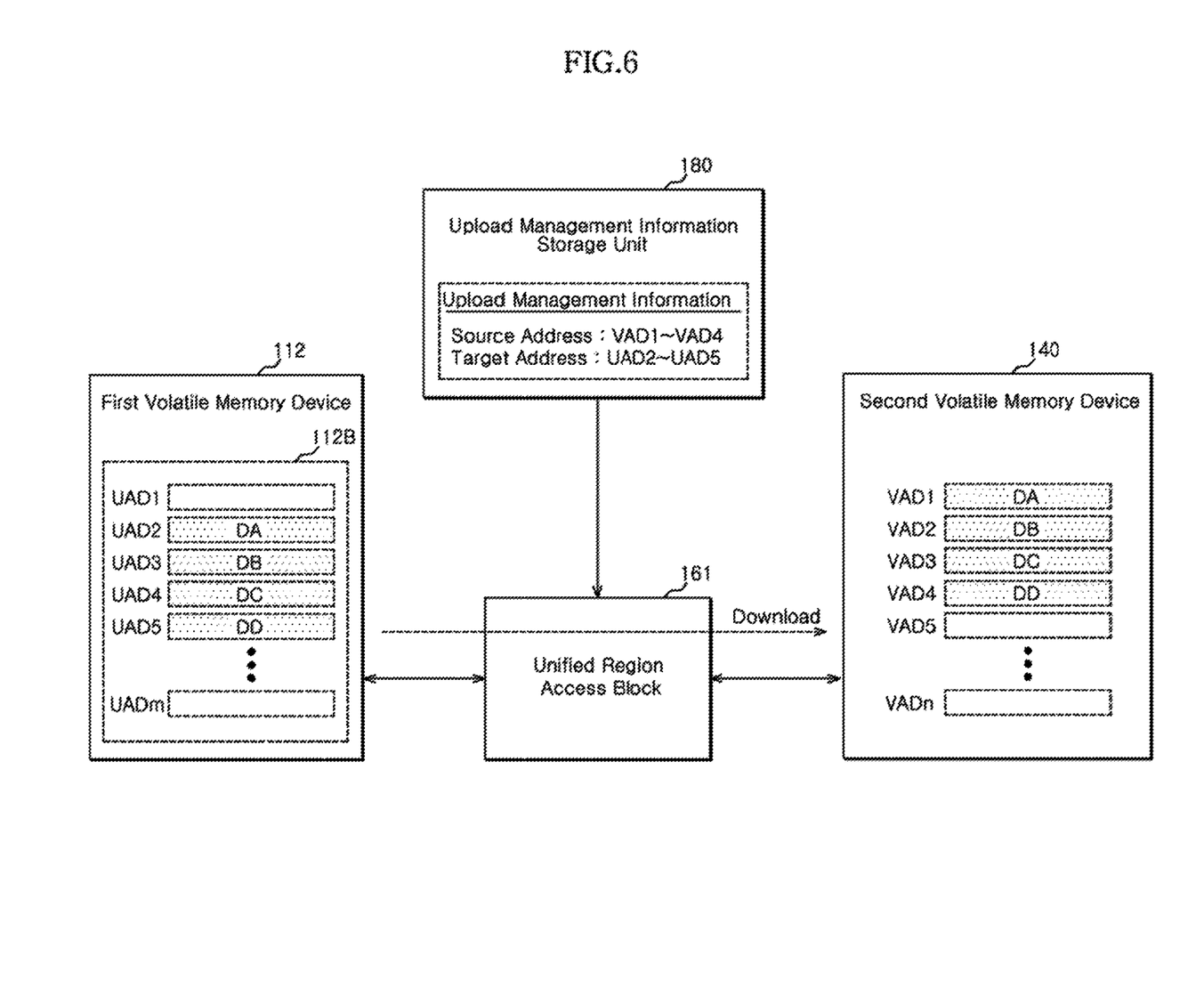
FIG. 6 is a block diagram exemplarily showing operations of the data storage device shown in FIG. 1 when the data storage device enters the normal mode from the power-save mode.

FIG. 6 is a block diagram exemplarily showing operations of the data storage device 120 shown in FIG. 1 when the data storage device 120 enters the normal mode from the power-save mode. In order to ensure that the data storage device 120 may come back to the state before entry to the power-save mode when the data storage device 120 returns from the power-save mode to the normal mode, the unified region access block 161 may download the subject data stored in the unified region 112B to the second volatile memory device 140. The unified region access block 161 in the host interface unit 160 may stay activated even in the power-save mode. For this reason, the unified region access block 161 may download the subject data to the second volatile memory device 140 in place of the second controller 130 during the course of wake-up of the second controller 130 when the data storage device 120 returns from the power-save mode to the normal mode.

The unified region access block 161 may perform a download operation by referring to the upload management information stored in the upload management information storage unit 180, without the control of the second controller 130. The unified region access block 161 may access the unified region 112B based on the target addresses UAD2, UAD3, UAD4 and UAD5 and may read the subject data DA, DB, DC and DD. The unified region access block 161 may access the second volatile memory device 140 based on the source addresses VAD1, VAD2, VAD3 and VAD4 and may store the subject data DA, DB, DC and DD into the second volatile memory device 140.

In the case of the upload management information scheme described above with reference to FIGS. 4 and 5, when the data storage device 120 returns from the power-save mode to the normal mode, the unified region access block 161 may perform an operation of extracting and decoding the header information HD, which may be previously added to the subject data. For example, when the data storage device 120 returns from the power-save mode to the normal mode, the unified region access block 161 may sequentially access the memory region of the unified region 112B, which corresponds to the target address range UAD2 to UAD5 of the upload management information. The unified region access block 161 may extract and decode the header information HD from the respective subject data DA, DB, DC and DD. Moreover, the unified region access block 161 may store the subject data DA, DB, DC and DD, from which the header information HD are extracted, in the memory region of the second volatile memory device 140 corresponding to the respective source addresses VAD1 to VAD5, according to a decoding result of the header information HD.

Figure 7:
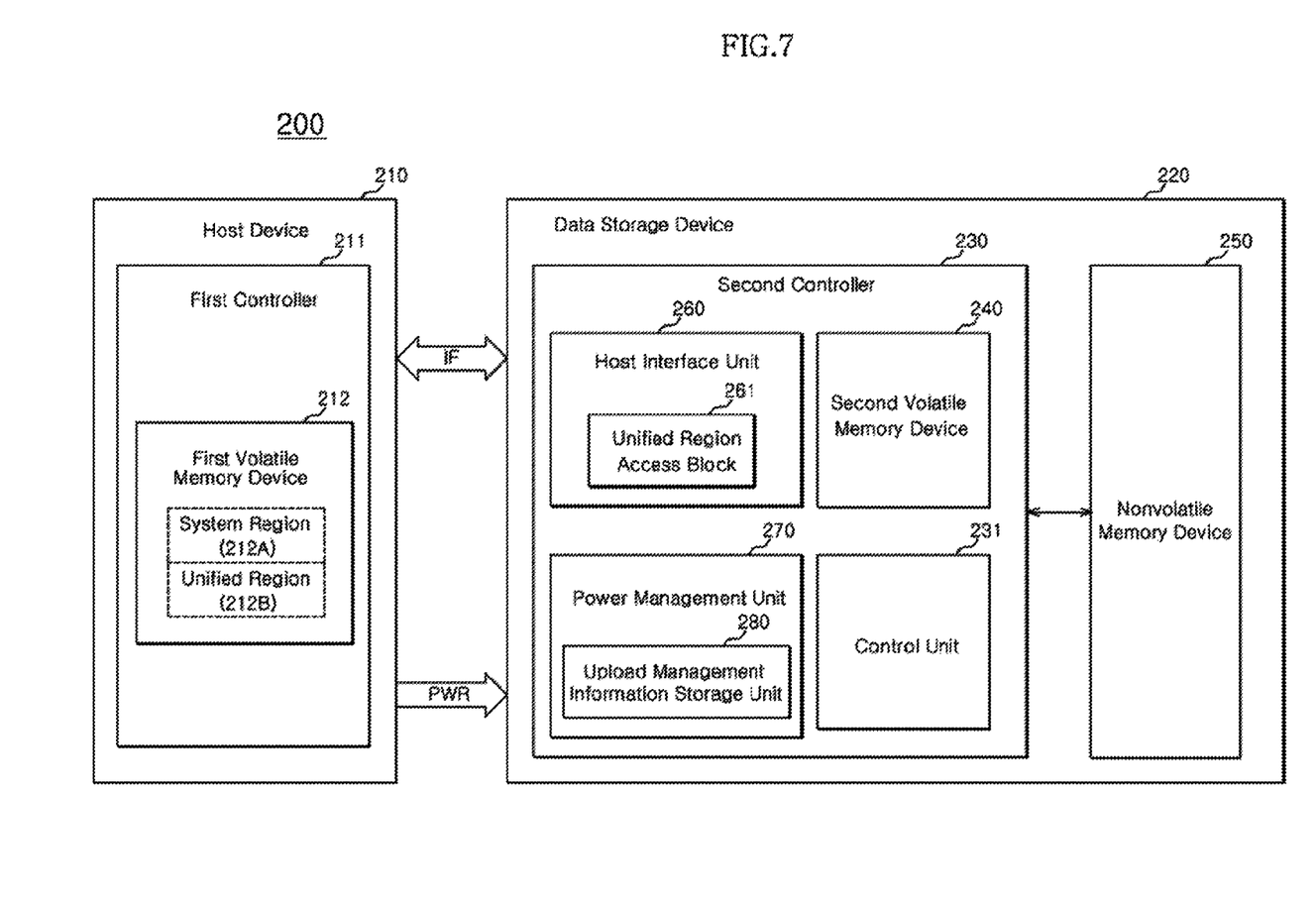
FIG. 7 is a block diagram exemplarily showing a data processing system in accordance with an embodiment of the present disclosure.

FIG. 7 is a block diagram exemplarily showing a data processing system in accordance with an embodiment of the present disclosure. Referring to FIG. 7, a data processing system 200 may include a host device 210 and a data storage device 220.

The host device 210 may include a first controller 211. The first controller 211 may include a first volatile memory device 212 including a system region 212A and a unified region 212B.

The data storage device 220 may include a second controller 230 and a nonvolatile memory device 250. The second controller 230 may include a control unit 231, a second volatile memory device 240, a host interface unit 260, and a power management unit 270. The host interface unit 260 may include a unified region access block 261. The power management unit 270 may include an upload management information storage unit 280.

The control unit 231 may be the same as the second controller 130 described above with reference to FIGS. 1 to 6. The host device 210, the first controller 211, the first volatile memory device 212 the system region 212A, and the unified region 212B shown in FIG. 7 are the same as the host device 110, the first controller 111, the first volatile memory device 112, the system region 112A, and the unified region 112B described above with reference to FIGS. 1 to 6. The data storage device 220, the nonvolatile memory device 250, the second volatile memory device 240, the host interface unit 260, the power management unit 270, the unified region access block 261, and the upload management information storage unit 280 shown in FIG. 7 may be the same as the data storage device 120, the nonvolatile memory device 150, the second volatile memory device 140 the host interface unit 160, the power management unit 170, the unified region access block 161, and the upload management information storage unit 180 described above with reference to FIGS. 1 to 6.

While certain embodiments have been described above, it will be understood to those skilled in the art that the embodiments described are by way of example only. Accordingly, the data storage device and the data processing system including the same described herein should not be limited based on the described embodiments. Rather, the data storage device and the data processing system including the same described herein should only be limited in light of the claims that follow when taken in conjunction with the above description and accompanying drawings.

What is claimed is:

1. A data processing system comprising:
a host device including a first volatile memory device; and
a data storage device coupled with the host device through a host interface and suitable for storing data to be accessed by the host device, wherein
the data storage device comprises:
a controller suitable for controlling an operation of the data storage device;
a second volatile memory device suitable for storing data necessary to drive the controller; and
an access block suitable for uploading data stored in the second volatile memory device to the first volatile memory device through the host interface according to control of the controller before the data storage device in a normal mode enters a power-save mode and downloading the data previously uploaded to the first volatile memory device to the second volatile memory device through the host interface independently from the control of the controller when the data storage device in the power-save mode returns to the normal mode,
wherein the access block stays activated in the power-save mode.

2. The data processing system according to claim 1, wherein the controller generates an upload management information including a source address and a target address, and provides the upload management information to the access block, and
the source address corresponds to the data stored in the second volatile memory device, and the target address corresponds to the data to be transmitted from the second volatile memory device and stored in the first volatile memory device.

3. The data processing system according to claim 2, wherein the controller generates the upload management information representing correspondence relationship between the source address and the target address.

4. The data processing system according to claim 2, wherein the controller generates the upload management information representing range of the source address and range of the target address.

5. The data processing system according to claim 4, wherein the controller adds header information representing correspondence relationship between the source address and the target address to the data stored in the second volatile memory device.

6. The data processing system according to claim 2, wherein the data storage device further comprises an upload management information storage unit suitable for storing the upload management information according to control of the controller.

7. The data processing system according to claim 6, wherein the data storage device further comprises a power management unit suitable for supplying power to the access block and the upload management information storage unit during the power-save mode of the data storage device.

8. The data processing system according to claim 1, wherein the data storage device further comprises a nonvolatile memory device suitable for storing data provided by the host device.

9. The data processing system according to claim 8, wherein the controller backs up the data stored in the second volatile memory device to the nonvolatile memory device before the data storage device in the normal mode enters the power-save mode.

10. The data processing system according to claim 1, wherein the host device allocates a unified region in the first volatile memory device, which is to be shared with the data storage device, and provides an address of the unified region to the data storage device.

11. A data storage device comprising:
- a nonvolatile memory device; and
- a controller suitable for storing data in the nonvolatile memory device and providing data stored in the nonvolatile memory device to a host device according to a request from the host device, wherein the controller comprises:
- a control unit;
- a volatile memory device suitable for storing data necessary to drive the control unit; and
- a host interface unit including an access block suitable for uploading data stored in the volatile memory device to the host device through a host interface according to control of the control unit before the data storage device in a normal mode enters a power-save mode and downloading the data previously uploaded to the first volatile memory device to the second volatile memory device through the host interface independently from the control of the control unit when the data storage device in the power-save mode returns to the normal mode, and interfacing the host device and the controller, wherein the access block stays activated in the power-save mode.

12. The data storage device according to claim 11, wherein the controller further comprises a upload management information storage unit suitable for storing an upload management information including reference information for data transfer between the host device and the volatile memory device.

13. The data storage device according to claim 12, wherein the controller further comprises a power management unit suitable for supplying power to the data storage device according to control of the control unit, wherein the power management unit supplies power to the host interface unit and the upload management information storage unit during the power-save mode of the data storage device.

* * * * *